May 19, 1942.    W. A. HUMPHREY    2,283,808
COMMUTATOR
Filed Aug. 21, 1937

INVENTOR
Warren A. Humphrey
BY
Harry S. Dumarez
ATTORNEY

Patented May 19, 1942

2,283,808

UNITED STATES PATENT OFFICE 2,283,808

COMMUTATOR

Warren A. Humphrey, Homeworth, Ohio, assignor to The Hoover Company, North Canton, Ohio, a corporation of Ohio Application August 21, 1937, Serial No. 160,256

1 Claim. (Cl. 171—321)

This invention relates to a new and improved commutator for electric motors.

An object of the invention is to provide a commutator having commutator segments provided with a longitudinally extending portion for connection with an armature winding. Another object is to provide a commutator having its individual commutator segments molded in an electric insulating hub. Other objects and advantages of the invention will be apparent from the specification and drawing, wherein.

Figure 1:
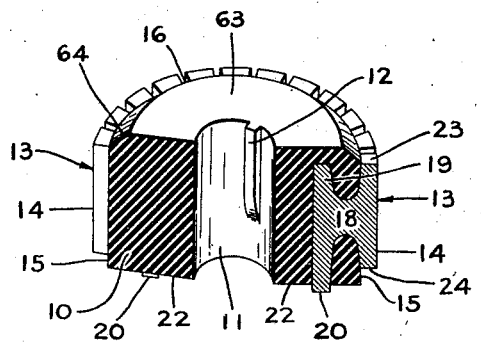
Fig. 1 is a sectional perspective view of the molded commutator.

The commutator comprises a hub 10 molded of suitable electric insulating material, such as a phenol-formaldehyde thermo-setting compound, for example Bakelite. As shown, the hub 10 is provided with a central bore 11, and an integrally molded key 12 for insertion in a cooperating slot in an armature shaft 25 to prevent relative rotation therebetween. Imbedded in the hub 10, by the molding operation, is a plurality of spaced commutator segments or bars 13 having their motor brush contacting portions 14 projecting radially beyond the periphery 15 of the hub 10 to provide undercuts 16 between the adjacent commutator bars.

Figure 2:
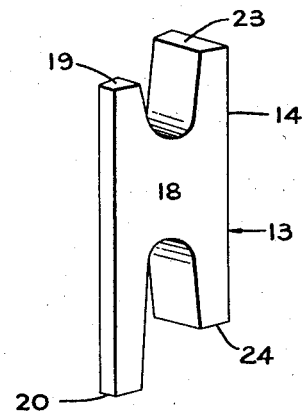
Fig. 2 is a perspective view of the commutator bar.

A metal commutator bar is shown in detail in Figure 2 and is tapered inwardly toward its inner edge and comprises the motor brush engaging portion 14 having opposite ends 23 and 24 projecting beyond a reduced section 18 from which extends projections 19 and 20, the latter projection extending beyond the end 24 of the brush engaging portion 14 and the armature end 22 of the commutator hub 10.

Figure 3:
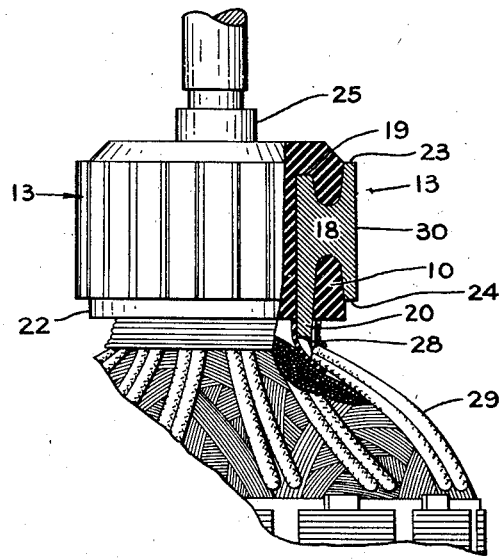
Fig. 3 is a fragmentary view showing a method of securing the commutator segments to an armature winding.

In Figure 3 the projections 20, on the commutator segments, extend beyond the end 22 of the commutator hub, and are soldered as indicated at 28 to an armature lead 29. In this method of connecting the armature lead to the commutator projection 20, the motor brush contacting surface area 30 of the commutator bars 13 is not reduced by slots normally provided in the brush contacting area for connection to the armature winding.

I claim:

In a commutator, a hub of electric insulating material, a plurality of commutator segments having anchor means embedded in said hub, said segments having brush engaging surfaces spaced along the periphery of said hub and extending outwardly therefrom, and each of said anchor means having a portion extending from one axial end of said hub and inwardly of the periphery of said brush engaging surfaces and of the pepheriphery of said hub for connection to an armature winding.

WARREN A. HUMPHREY.